Dec. 27, 1938.   J. PANAGOPOULOS   2,141,221
BEER DRAWING AND COOLING SYSTEM
Filed Oct. 14, 1937
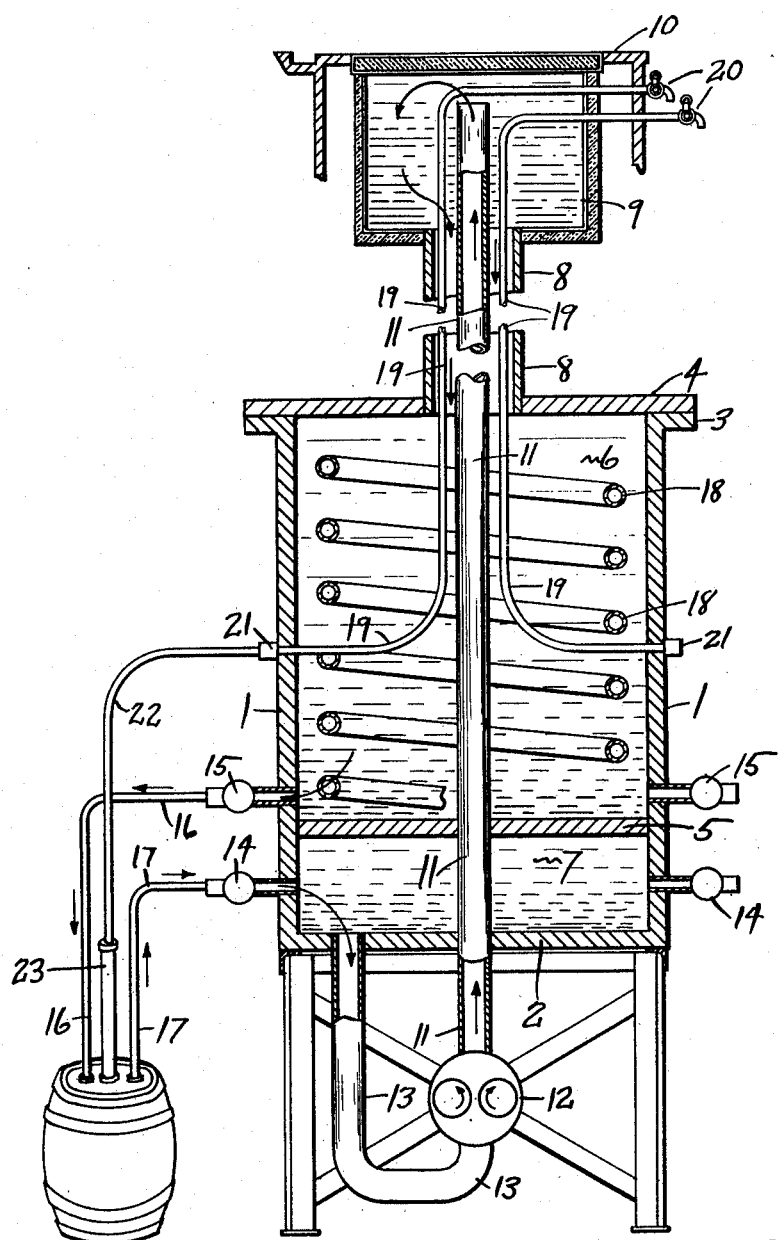
John Panagopoulos,
INVENTOR.
BY W. B. Harpman,
ATTORNEY.

Patented Dec. 27, 1938

2,141,221

UNITED STATES PATENT OFFICE 2,141,221

BEER DRAWING AND COOLING SYSTEM

John Panagopoulos, Youngstown, Ohio

Application October 14, 1937, Serial No. 168,923

4 Claims. (Cl. 225—1)

This invention relates to a beer drawing and cooling system.

The principal object of this invention is the provision of a beer drawing and cooling system formed in a compact unit.

A further object of this invention is the provision of refrigeration coils formed as a part of the beer drawing and cooling system.

A further object is the provision of a beer drawing and cooling system provided with means for circulating a cooling agent through a plurality of beer kegs each having a heat exchanging device incorporated therein.

A still further object is the provision of a beer drawing and cooling system designed to convey beer or similar beverages from the keg to the dispensing spigot, and cool it at the same time.

The beer drawing and cooling system shown and described in this application has been designed so as to form as simple and compact a unit as possible, the entire system being self contained, with of course the exception of a refrigerant compressor which can be readily positioned along side of the unit when in operation. The unit has been designed to cool and dispense beer or similar beverages from one or more kegs as desired, and is particularly adapted for multiple keg installations utilizing kegs of the kind described above.

This beer cooling and drawing system is an improvement over my patent, No. 2,096,591, on Beer cooler device, dated October 19, 1937; and my copending applications, Ser. No. 132,977, on Beer drawing system, and Ser. No. 163,903, on Beer cooling and drawing system.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein:—

The figure is a side elevation, with parts broken away and parts in cross section, showing the beer drawing and cooling system, the beer keg being shown on a relatively smaller scale.

By referring to the drawing it will be seen that this beer drawing and cooling system comprises, primarily, a circular body member 1 having a bottom section 2 formed thereon, and provided at its top with an outwardly extending flange 3 adapted to receive and retain, in water tight connection, a top 4. Positioned within and near the bottom of this circular body member 1, there is a horizontal partition 5 which serves to separate the body member 1 into two liquid containing compartments 6 and 7. Positioned centrally upon the top 4, there is a tube 8 which is of sufficient length to extend upwardly and connect to a cooling tank 9, which is formed within a dispensing bar 10. Positioned centrally within the circular body member 1 and extending downwardly through the horizontal partition 5 and bottom section 2 thereof, there is a secondary tube 11, the lower end of which is connected to a circulating pump 12, and the upper end of which extends upwardly within the tube 8 and ends well within the cooling tank 9. An additional tube 13 connects the circulating pump 12 to the bottom compartment 7, being tapped through the bottom section thereof. Positioned around this compartment 7 there are a plurality of valved taps 14. Positioned around the bottom of the compartment 6 there is another series of valved taps 15, these valved taps 14 and 15 being provided to circulate the liquid cooling agent through cooling coils positioned within the beer keg by means of hose 16 and 17. Refrigeration coils 18 are positioned within the compartment 6 of the circular body member 1, and are designed to be supplied with a refrigerant from a compressor, in such manner as to adequately cool the liquid within the device. Positioned within this compartment 6 and extending through the tube 8 are a plurality of beverage supply pipes 19. These beverage supply pipes 19 extend upwardly through the complete length of the tube 8 and through the cooling tank 9 to the outside of the bar 10 where spigots 20 are located. The lower ends of these beverage pipes extend downwardly within the compartment 6 and terminate in connections 21 positioned around the circular body member 1. A flexible metallic hose 22 is provided from the connection 21 and is designed to connect with a draft rod 23 of the beer keg.

By referring to the drawing it will be seen that the circulation of the liquid cooling agent through the various parts thereof has been indicated by means of arrows. These arrows show the cooling liquid circulating from the compartment 6 through the beer keg by means of the tubes 16 and 17, and leading to the compartment 7. The cooling agent is then circulated downwardly from the compartment 7 through the tube 13 to the circulating pump 12. From the circulating pump 12 the cooling agent is forced upwardly through the secondary tube 11, completely through the drawing and cooling unit, to a point well within the cooling tank 9 positioned in the bar 10. The cooling liquid then flows downwardly through the tube 8 to the compartment 6. It will be seen that I have provided an efficient means of drawing and cooling beverages, such as beer and the like, the device being so formed that a plurality of beverage kegs may be placed around it and connected thereto. It is obvious that the relatively short length of the beverage pipe from the beverage keg to the dispensing spigot, is adequately cooled so that the beverage reaches the spigot in suitable condition for serving.

This drawing and cooling system has been designed for installation upon two floors; for instance, the bar 10 being located on the main floor of the establishment and the remainder of the unit positioned on the floor below, thus enabling the beverage kegs to be changed without causing any inconvenience.

It is understood that, if desired, an air agitating device may be substituted for the pump 12, the resulting air agitation causing the cooling agent to circulate just as efficiently as the pump.

What I claim is:—

1. In a beer drawing and cooling system comprising a cooling tank positioned underneath a bar and a body member having a partition therein, said partition designed to form upper and lower compartments for retaining a cooling agent, a refrigeration coil positioned in one of said compartments, a plurality of taps from said compartments adapted to provide channels to and from a plurality of beer kegs for a cooling agent, a top on said body member, a main tube in communication with the upper compartment and the cooling tank, a secondary tube positioned through the said compartments and extending upwardly through the said main tube into the said cooling tank, pump means for circulating the cooling agent through the said tubes, cooling tank, and compartments, a plurality of pipes leading from the said beer kegs through the said upper compartment, main tube, and cooling tank to a spigot on the bar.

2. A beer drawing and cooling system comprising a cooling tank positioned underneath a bar, and a circular body member having a partition therein, said partition designed to form upper and lower compartments for retaining a cooling agent, a refrigeration coil positioned in one of said compartments, a plurality of valved taps from said compartments adapted to provide channels to and from a plurality of beer kegs for a cooling agent, a main tube in communication with the upper compartment and the cooling tank, a secondary tube positioned through the said compartments and extending upwardly through the said main tube into the said cooling tank, means for circulating the cooling agent through said tubes, cooling tank, and compartments, a plurality of detachable pipes connected to said beer kegs and leading through said upper compartment, main tube, and cooling tank to spigots positioned on the bar.

3. A beer drawing and cooling system comprising an upper tank, a lower tank having upper and lower compartments for retaining a cooling agent, a refrigeration coil positioned in the upper compartment, an outer tube in communication with said upper compartment and said upper tank, an inner tube extending through both said upper and lower compartments and through said outer tube into said upper tank, a plurality of outlets from the upper compartment adapted to provide communication with heat exchanging devices incorporated in beer kegs, a plurality of apertures in the lower compartment providing communication with said devices, a pump having its inlet connected with said lower compartment and its outlet connected with said inner tube, and conduits extending through said outer tube and upper tank and adapted to conduct beer from said kegs.

4. In a beer drawing and cooling system in which the beer is contained in kegs having heat exchanging devices incorporated therein, the combination of an upper tank, a lower tank having two compartments for retaining a cooling agent, a refrigeration coil positioned in the upper compartment, an outer tube in communication with the upper compartment and the upper tank, an inner tube extending through the upper and lower compartments and said outer tube and projecting into said upper tank, means providing communication between the upper compartment and the heat exchanging devices, means providing communication between the lower compartment and the heat exchanging devices, a pump having its inlet connected with said lower compartment and its outlet connected with said inner tube, and conduits connected with said kegs and extending upwardly through said outer tube and upper tank and adapted to conduct beer from said kegs.

JOHN PANAGOPOULOS.